United States Patent
Jan

(10) Patent No.: US 6,729,724 B1
(45) Date of Patent: May 4, 2004

(54) SPECTACLE LENS HOLDING STRUCTURE

(75) Inventor: Shuo-Yuan Jan, Taipei (TW)

(73) Assignee: Gazelle Corporation, Taipei (TW)

( * ) Notice: Subject to any disclaimer, the term of this patent is extended or adjusted under 35 U.S.C. 154(b) by 0 days.

(21) Appl. No.: 10/373,059

(22) Filed: Feb. 26, 2003

(51) Int. Cl.⁷ .................................................. G02C 1/04
(52) U.S. Cl. ...................................... 351/110; 351/140
(58) Field of Search ................................. 351/110, 140, 351/120, 106, 103, 153, 41

(56) References Cited

U.S. PATENT DOCUMENTS 5,592,242 A * 1/1997 Ooie ........................... 351/44
5,946,072 A * 8/1999 Canavan ..................... 351/120
6,102,542 A * 8/2000 Masuda ....................... 351/110

* cited by examiner

Primary Examiner—Hung X. Dang
(74) Attorney, Agent, or Firm—Rosenberg, Klein & Lee

(57) ABSTRACT

A spectacle lens holding structure comprises a spectacle lens having a indent on side of connecting temple wherein the horizontal inside of indent has a positional strip, and vertical side of positional strip includes a fastening gibbous object; and a holding member having a first opening for placing the spectacle lens and a second opening for connecting a hinge of the temple wherein the holding member has a channel passed through the first and second opening for placing the positional strip and can fasten the spectacle by the fastening gibbous object of the positional strip. The spectacle lens holding structure is easy to disassemble without any tools.

21 Claims, 6 Drawing Sheets

SPECTACLE LENS HOLDING STRUCTURE

BACKGROUND OF THE INVENTION

1. Field of the Invention

The present invention related to a spectacle structure, in particularly, to a spectacle lens holding structure which discloses a holding member for fastening the spectacle lens on the temple.

2. Description of the Related Art

There are many conventional methods for connecting the spectacle lens and temple. As a rule, the connection of the spectacle lens and temple uses screws which need tools for loose and fastening. The connecting ways of spectacle lens and temple are according to the structure of spectacle lens and temple.

Refer to FIGS. 1A and 1B, the plate spectacle lens 10 has a zigzag structure at top edge for assembly. The zigzag structure includes at least one recession 12 and positional convexity 14. And, the flame 16 has an assembly member 17 opposed to the recession 12 and a positional recession 18 opposed to the positional convexity 14. The flame 16 connects to the spectacle lens 10 by the assembly member 17 conjugating the recession 12 and the positional recession 18 conjugating the positional convexity 14. Therefore, the structure of zigzag has many disadvantages, for example: when horizontally shifts, then the spectacle and flame are easy to disassembly.

SUMMARY OF THE INVENTION

It is an object of the present invention is to provide a spectacle lens holding structure which uses a holding member for conjugating the flame and spectacle lens.

It is another object of the present invention is to provide a spectacle lens holding structure which is easy to disassemble without any tools.

The connecting structure of spectacle and temple of present invention comprises a positional strip in indent of spectacle lens which has a fastening gibbous object. And, the spectacle lens connects to a holding member by the fastening gibbous object placing a second opening.

Further more, the connecting structure of another embodiment of the present invention comprises a fastening gibbous object and a holding member having an opening for placing the spectacle lens and connecting to a hinge of the temple.

BRIEF DESCRIPTION OF THE DRAWINGS

The above and further objects, features and advantages of the invention will become clear from the following more detailed description when read with reference to the accompanying drawings in which.

DETAILED DESCRIPTION OF THE PREFERRED EMBODIMENT

Figure 1A:
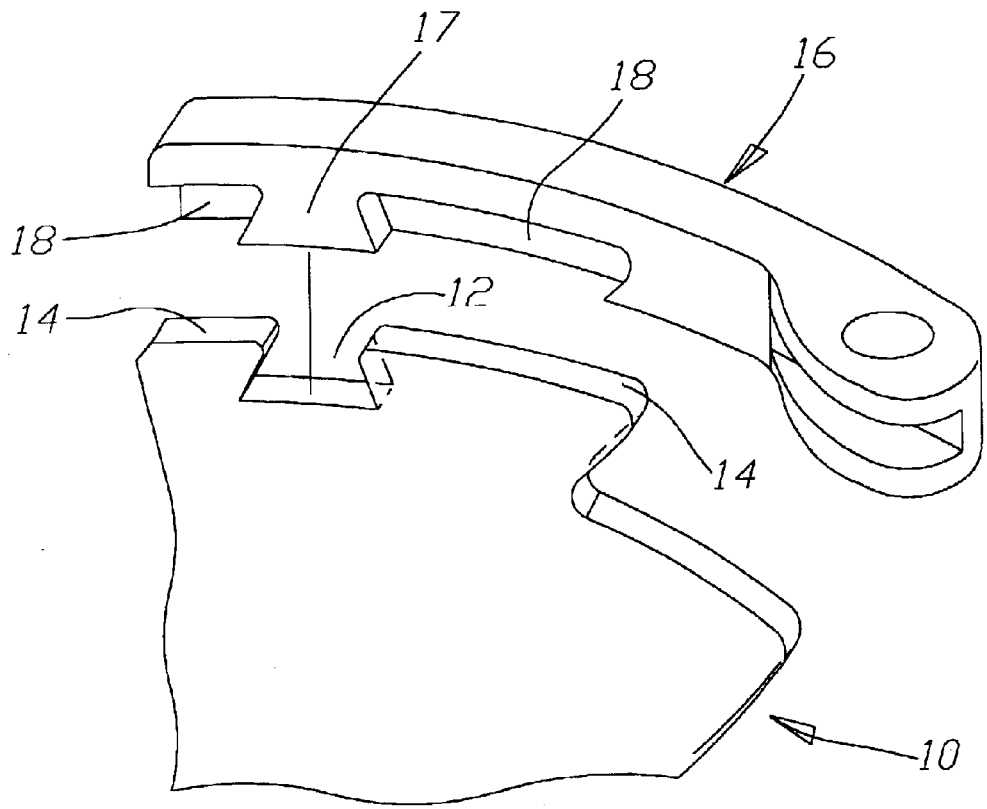
FIG. 1A is a partial enlarged view for the flame and spectacle lens of the prior art.
Figure 1B:
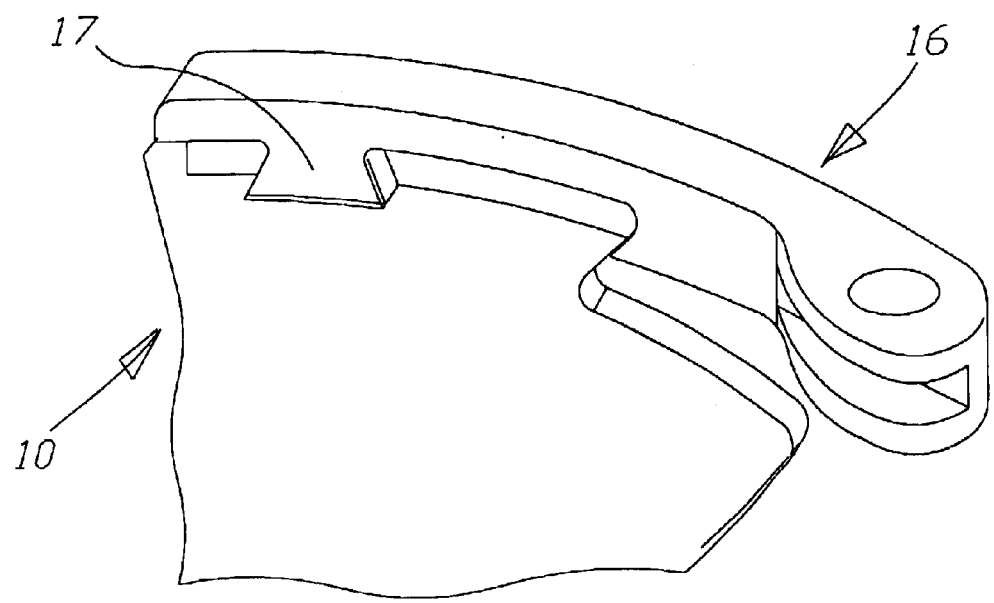
FIG. 1B is a schematic diagram for assembling of the prior art.
Figure 2:
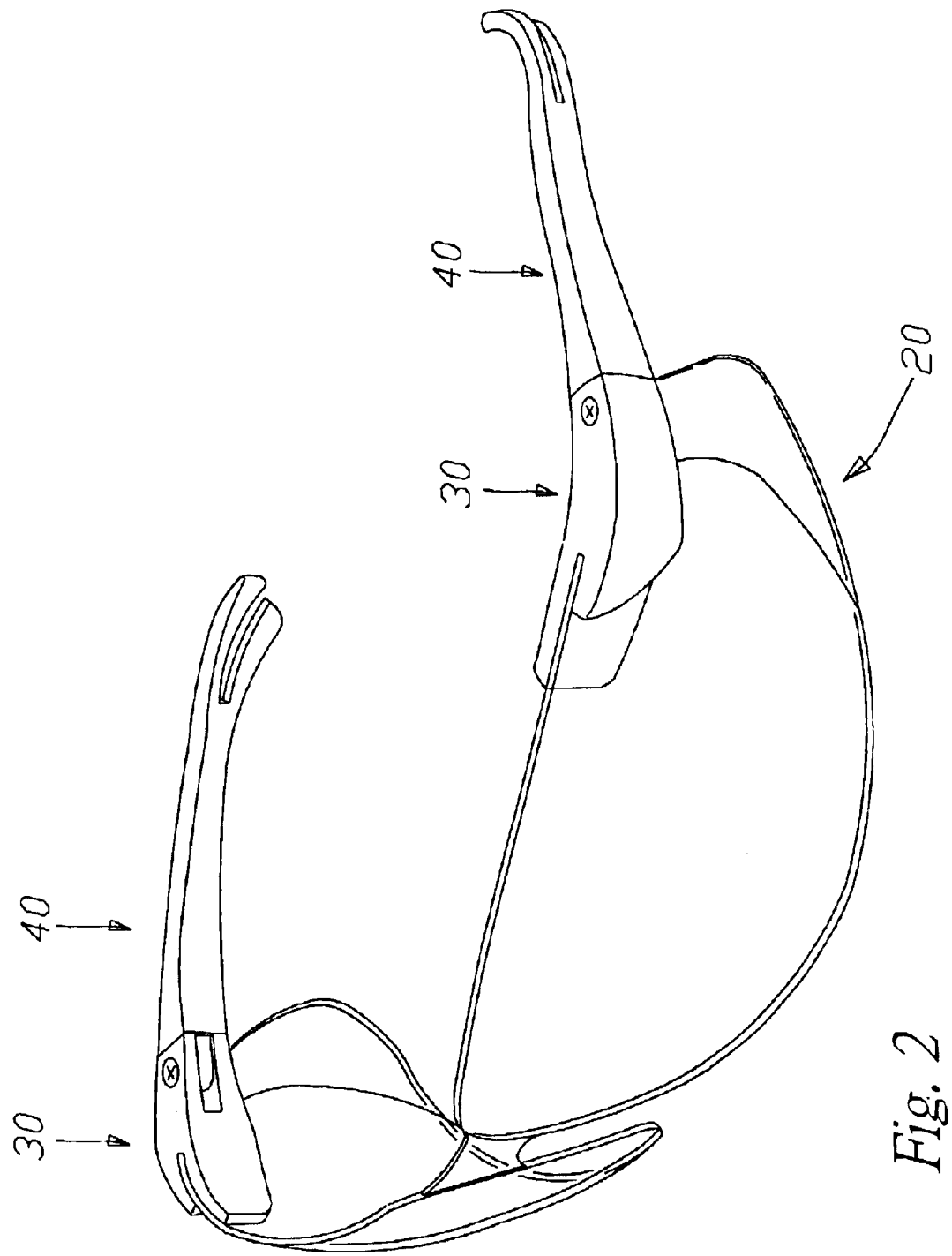
FIG. 2 is a schematic view of the present invention.
Figure 3:
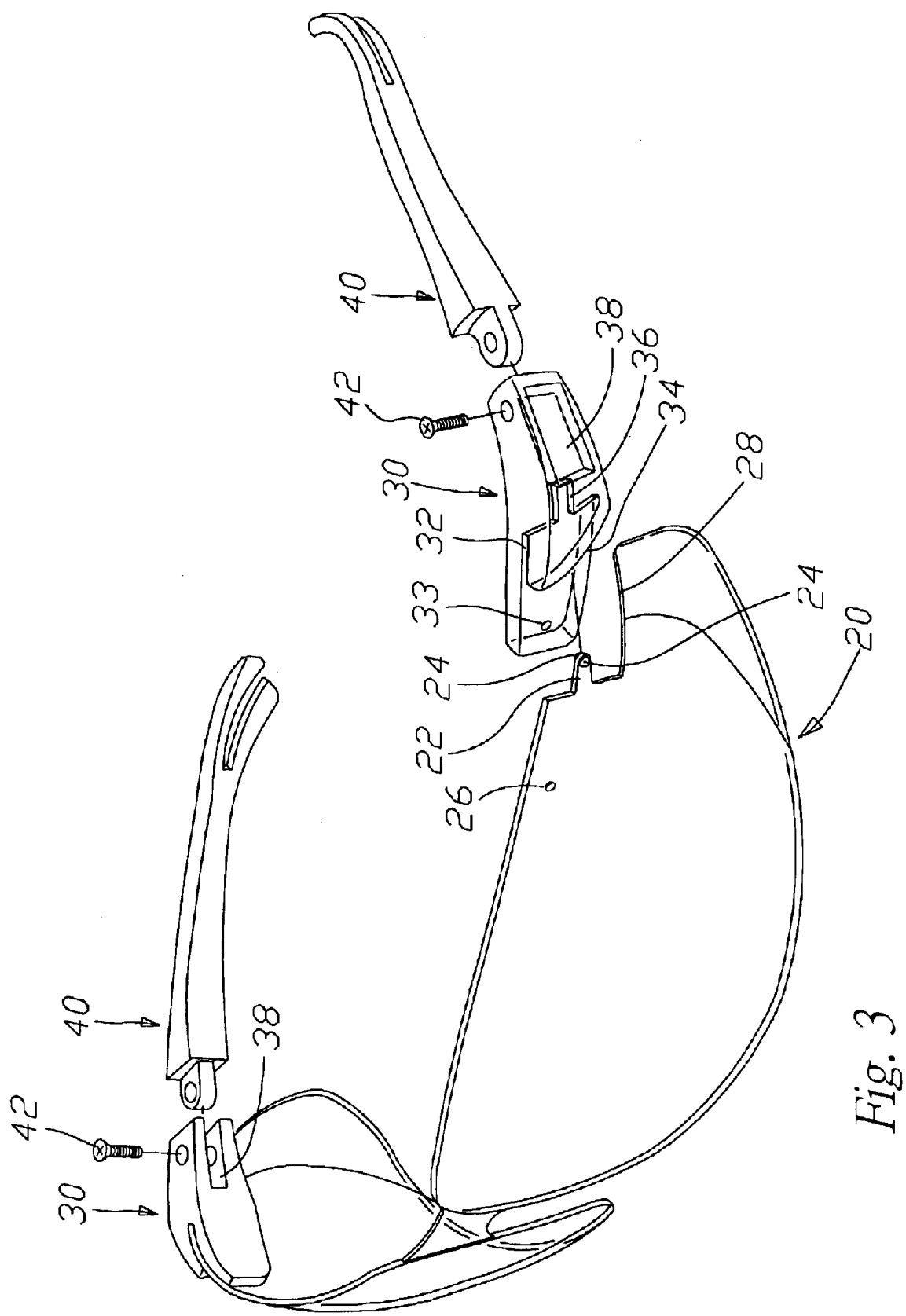
FIG. 3 is an explosive view of the present invention.

Refer to FIGS. 2 and 3, the spectacle structure of the present invention comprises a spectacle lens 20 having a indent on side of connecting temple 40 wherein the horizontal inside of indent has a positional strip 22, and vertical side of positional strip 22 includes a fastening gibbous object 24. Further more, the spectacle structure of the present invention comprises a holding member 30 having a first opening 32 for placing the spectacle lens 20 and a second opening 38 for connecting a hinge of the temple 40 wherein the holding member 30 has a channel 34 passed through the first and second openings 32,38 for placing the positional strip 22 and can fasten the spectacle by the fastening gibbous object 24 of the positional strip 22.

The fastening gibbous object 24 can place both vertical sides, inside or outside of the positional strip 22.

Figure 4A:
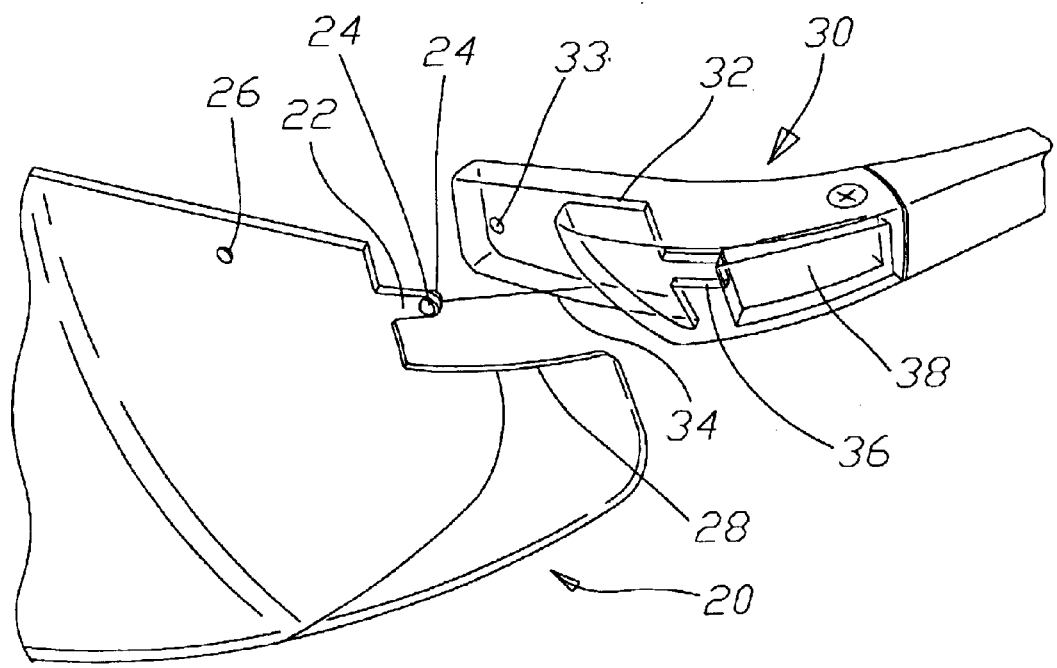
FIG. 4A is a schematic diagram for assembling for spectacle lens and holding member of the present invention.
Figure 4B:
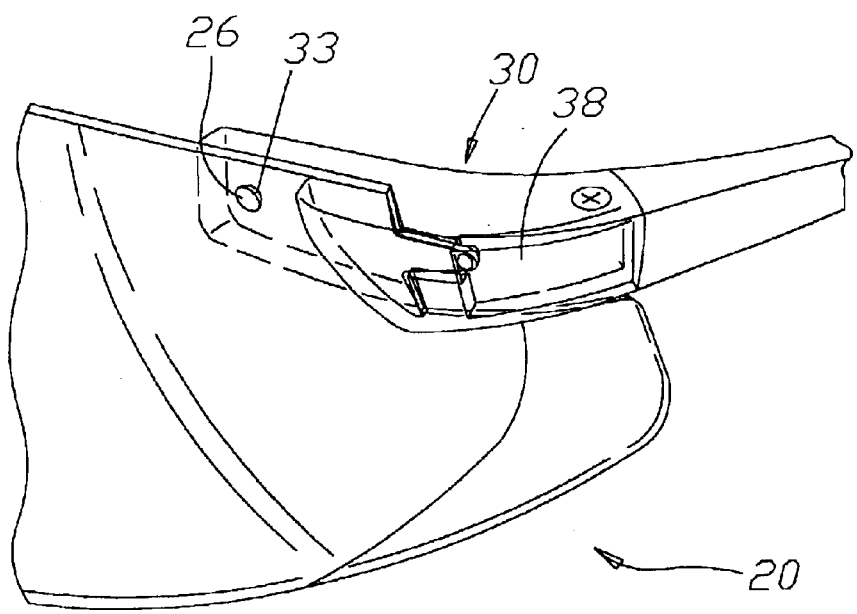
FIG. 4B is a schematic diagram for assembling for the spectacle lens and holding member of the present invention.

Refer to FIGS. 4A and 4B, the spectacle structure of the present invention further comprises an assembly 26 placed on top vertical inside wall, outside wall or both side walls of spectacle lens 20 for mounting on an assembling hole 33 on vertical side of first opening 32 wall. When the spectacle lens 20 inserts into the first opening 32 of holding member 30, the positional strip 22 passes through the channel 36 and into the second opening 38. Therefore, the spectacle lens 20 and holding member 30 are conjugated by the assembly 26 coupled to the assembling hole 33 and the fastening gibbous object 32 because the thickness of positional strip 22 is large than the second opening 38.

The spectacle structure of the present invention further comprises an assembling recess placed on top vertical inside wall, outside wall and both side walls of spectacle lens for mounting on an assembly on vertical side of first opening wall. The function of the assembling recess is same as the assembly 26.

Figure 5:
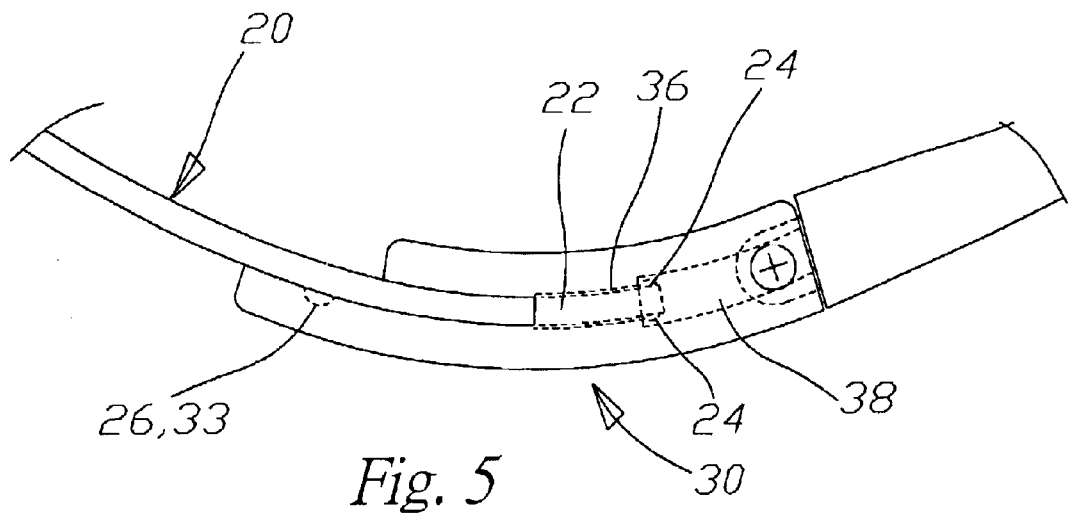
FIG. 5 is a perspective top view for the spectacle lens and holding member of the present invention.
Figure 6:
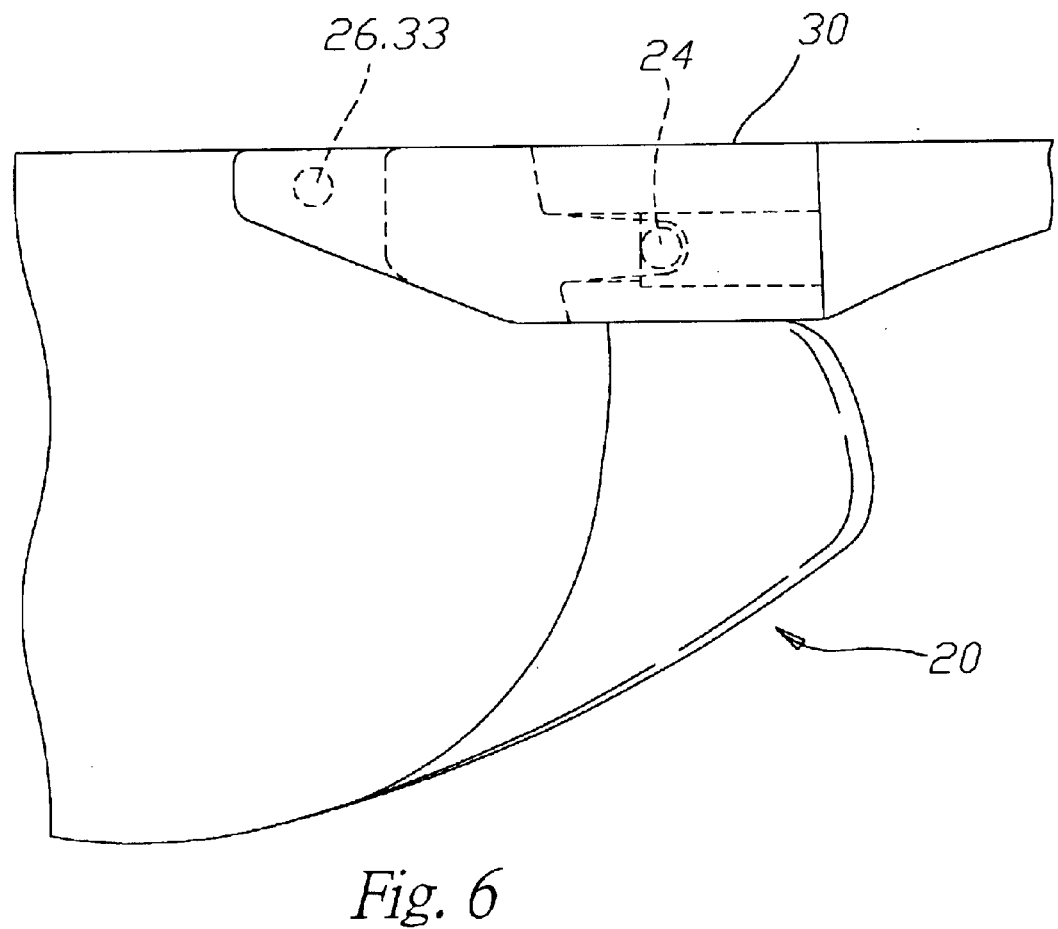
FIG. 6 is a perspective front view for the spectacle lens and holding member of the present invention.

Refer to FIGS. 5 and 6, the diameter of channel 36 is small than the second opening 38 so that the spectacle lens 20 can be fasten on the holding member 30 by the fastening gibbous object 32. The present invention has many advantages for example: according to the spectacle holding structure, the spectacle lens 20 and holding member 30 are hard disassembly when horizontal or spinning movement. And, spectacle lens 20 and holding member 30 tightly connect by the assembly 26 coupled to the assembling hole 33.

Figure 7:
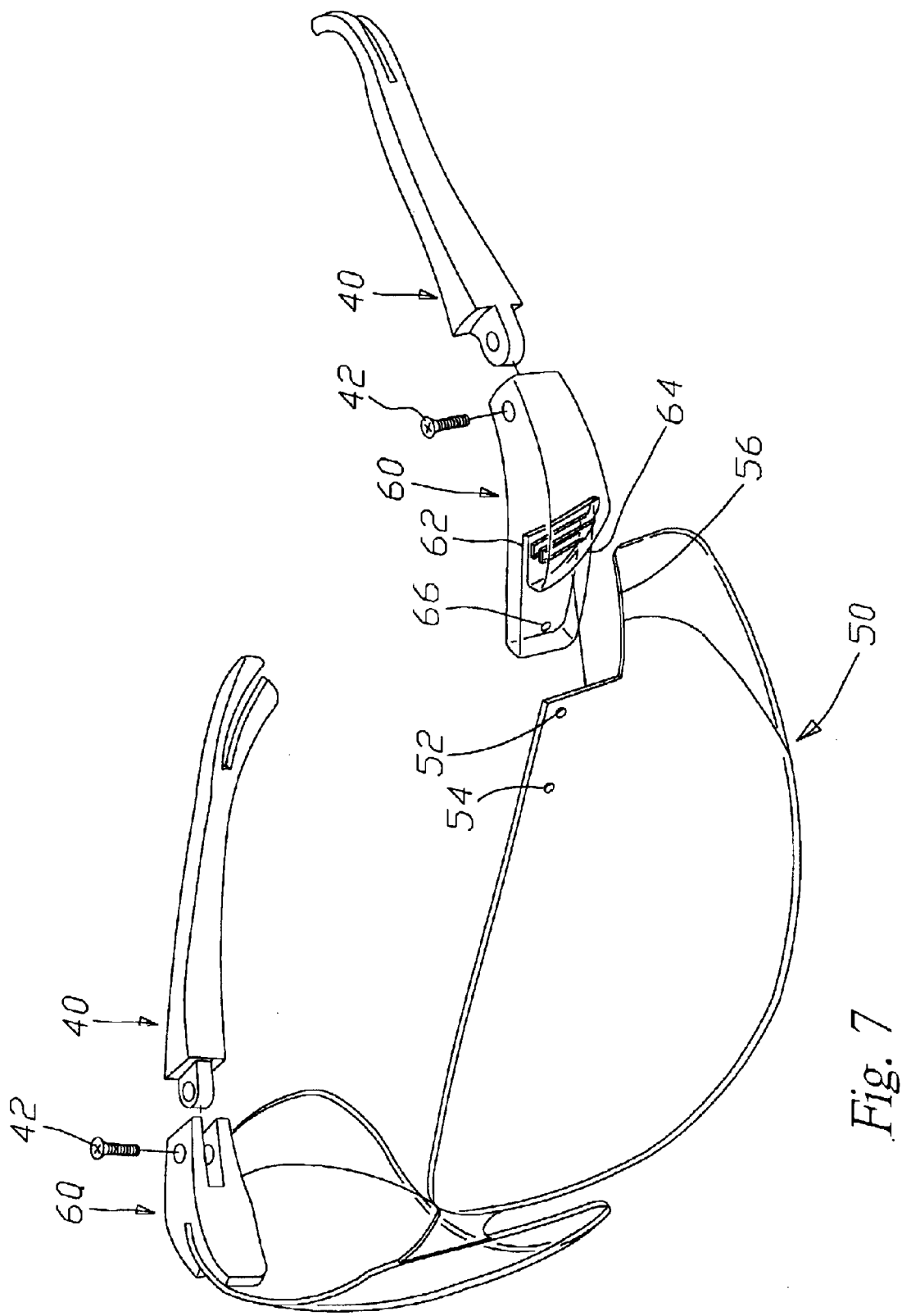
FIG. 7 is an explosive view for another embodiment of the present invention.

Refer to FIG. 7, another embodiment of the spectacle lens holding structure comprises a spectacle lens 50 having a indent on side of connecting temple 40 wherein the horizontal inside of indent has at least one fastening gibbous object 52, and a holding member 60 having an opening 64 for placing the spectacle lens 50 and connecting to a hinge of the temple 40 wherein the holding member 60 has a slot 62 for placing the fastening gibbous object 52 wherein the slot 62 places vertical direction form bottom to proper height of opening 64 wall for coupling to the spectacle lens 50

Therein, the fastening gibbous object 52 can place both vertical sides, inside or outside of the spectacle lens 50.

Further more, an assembly 54 is placed on top vertical inside wall, outside wall or both walls of spectacle lens 50 for mounting on an assembling hole 66 on vertical side of wall of opening 64.

And, an assembling recess placed on top vertical outside wall, inside wall or both sides of spectacle lens for mounting on an assembly on vertical side of wall of opening. Therefore, the function of the assembling recess is same as the assembly 54.

As above mention, the spectacle holding structure of the present invention uses the positional strip 22 placed in the indent of the spectacle lens 20 and inserting through the channel 36 into the second opening 38. The spectacle lens 20 is fastened on the holding member 30 by the fastening gibbous object 33 of the positional strip 22. And, the association of the holding member 30 and spectacle lens 20 is couples to the temple 40 by a screw 42. Further, using the assembly 26 opposes to the assembling hole 33 of wall of the first opening 32 for additional fastening strength.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A spectacle lens holding structure comprising:
   a spectacle lens having a indent on side of connecting temple wherein the horizontal inside of indent has a positional strip, and vertical side of positional strip includes a fastening gibbous object; and
   a holding member having a first opening for placing the spectacle lens and a second opening for connecting a hinge of the temple wherein the holding member has a channel passed through the first and second opening for placing the positional strip and can fasten the spectacle by the fastening gibbous object of the positional strip.

2. The spectacle lens holding structure of claim 1, wherein the fastening gibbous object can place both vertical sides.

3. The spectacle lens holding structure of claim 1, wherein the fastening gibbous object can place vertical inside.

4. The spectacle lens holding structure of claim 1, wherein the fastening gibbous object can place vertical outside.

5. The spectacle lens holding structure of claim 1, wherein further comprising an assembly placed on top vertical inside wall of spectacle lens for mounting on an assembling hole on vertical side of first opening wall.

6. The spectacle lens holding structure of claim 1, wherein further comprising an assembly placed on top vertical outside wall of spectacle lens for mounting on an assembling hole on vertical side of first opening wall.

7. The spectacle lens holding structure of claim 1, wherein further comprising an assembly placed on both top vertical side walls of spectacle lens for mounting on an assembling hole on vertical side of first opening wall.

8. The spectacle lens holding structure of claim 1, wherein further comprising an assembling recess placed on top vertical inside wall of spectacle lens for mounting on an assembly on vertical side of first opening wall.

9. The spectacle lens holding structure of claim 1, wherein further comprising an assembling recess placed on top vertical outside wall of spectacle lens for mounting on an assembly on vertical side of first opening wall.

10. The spectacle lens holding structure of claim 1, wherein further comprising an assembling recess placed on both top vertical side walls of spectacle lens for mounting on an assembly on vertical side of first opening wall.

11. The spectacle lens holding structure of claim 1, wherein the thickness of positional strip is large than the second opening for fastening the spectacle lens on the holding member by the fastening gibbous object.

12. A spectacle lens holding structure comprising:
    a spectacle lens having a indent on side of connecting temple wherein the horizontal inside of indent has at least one fastening gibbous object; and
    a holding member having an opening for placing the spectacle lens and connecting to a hinge of the temple wherein the holding member has a slot for placing the fastening gibbous object wherein the slot places vertical direction form bottom to proper height of opening wall for coupling to the spectacle lens.

13. The spectacle lens holding structure of claim 12, wherein the fastening gibbous object can place both vertical sides.

14. The spectacle lens holding structure of claim 12, wherein the fastening gibbous object can place vertical inside.

15. The spectacle lens holding structure of claim 12, wherein the fastening gibbous object can place vertical outside.

16. The spectacle lens holding structure of claim 12, wherein further comprising an assembly placed on top vertical inside wall of spectacle lens for mounting on an assembling hole on vertical side of wall of opening.

17. The spectacle lens holding structure of claim 12, wherein further comprising an assembly placed on top vertical outside wall of spectacle lens for mounting on an assembling hole on vertical side of wall of opening.

18. The spectacle lens holding structure of claim 12, wherein further comprising an assembly placed on both top vertical side walls of spectacle lens for mounting on an assembling hole on vertical side of wall of opening.

19. The spectacle lens holding structure of claim 12, wherein further comprising an assembling recess placed on top vertical inside wall of spectacle lens for mounting on an assembly on vertical side of wall of opening.

20. The spectacle lens holding structure of claim 12, wherein further comprising an assembling recess placed on top vertical outside wall of spectacle lens for mounting on an assembly on vertical side of wall of opening.

21. The spectacle lens holding structure of claim 12, wherein further comprising an assembling recess placed on both top vertical side walls of spectacle lens for mounting on an assembly on vertical side of wall of first opening.

* * * * *